United States Patent
Chen et al.

(10) Patent No.: US 11,966,726 B2
(45) Date of Patent: Apr. 23, 2024

(54) OPERATING SYSTEM (OS) SCHEDULER AND COMPILER FOR CODE GENERATION OPTIMIZATION IN A (SIMULTANEOUS MULTI-THREADING) SMT ENABLED CPU

(71) Applicant: INTERNATIONAL BUSINESS MACHINES CORPORATION, Armonk, NY (US)

(72) Inventors: Zheng Chen, Songjiang (CN); Jiu Fu Guo, Shanghai (CN); Gui HaoChen, Shanghai (CN); Chaofan Qiu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 17/652,572

(22) Filed: Feb. 25, 2022

(65) Prior Publication Data
US 2023/0273779 A1  Aug. 31, 2023

(51) Int. Cl.
*G06F 8/41* (2018.01)
(52) U.S. Cl.
CPC .................................. *G06F 8/443* (2013.01)
(58) Field of Classification Search
None
See application file for complete search history.

(56) References Cited

U.S. PATENT DOCUMENTS

| | | | |
|---|---|---|---|
| 9,569,261 B2 * | 2/2017 | Sato | G06F 9/3851 |
| 9,799,089 B1 * | 10/2017 | Chen | G06T 15/80 |
| 9,841,996 B2 * | 12/2017 | Sato | G06F 9/3814 |
| 2007/0124732 A1 | 5/2007 | Lia | |
| 2010/0161948 A1 * | 6/2010 | Abdallah | G06F 9/3853 712/228 |
| 2012/0036514 A1 * | 2/2012 | Master | G06F 9/445 718/104 |

(Continued)

FOREIGN PATENT DOCUMENTS

GB   2493607 A   *  2/2013   ..........  G06F 9/3016

OTHER PUBLICATIONS

Bergan et al., "CoreDet: A Compiler and Runtime System for Deterministic Multithreaded Execution," ACM, 2010. (Year: 2010).*

(Continued)

*Primary Examiner* — Ryan D. Coyer
(74) *Attorney, Agent, or Firm* — Teddi E. Maranzano

(57) ABSTRACT

A method, computer program product, and computer system are provided. An enhanced compiler identifies instructions for execution among them, instructions directed to an inner computation unit of a CPU core. In response to identifying instructions directed to the inner computation unit, locating in a system call table a system call to indicate a begin of an executable code block of instructions that are directed to the inner computation unit of the CPU core. The enhanced compiler searches the system hardware registry for the parameter corresponding to the inner computation unit of the CPU core. The system call is inserted as an interrupt instruction in the compiler output at the begin of the executable code block of instructions that are directed to the inner computation unit of the CPU core. The enhanced compiler executable code output is saved for later selection by a scheduler of an operating system.

18 Claims, 6 Drawing Sheets

(56) References Cited

U.S. PATENT DOCUMENTS

| | | | | |
|---|---|---|---|---|
| 2015/0277984 A1* | 10/2015 | Abraham | ............... | G06F 9/3009 |
| | | | | 718/1 |
| 2015/0277985 A1* | 10/2015 | Abraham | ............ | G06F 9/45533 |
| | | | | 718/1 |
| 2019/0050270 A1* | 2/2019 | Tamir | .................... | G06F 9/5077 |
| 2019/0265974 A1* | 8/2019 | Cheng | ........................ | G06T 1/20 |
| 2021/0263779 A1 | 8/2021 | Haghighat | | |
| 2021/0349725 A1* | 11/2021 | Kenney | ..................... | G06T 1/20 |
| 2023/0161576 A1* | 5/2023 | Schluessler | ........... | G06F 8/4441 |
| | | | | 717/153 |

OTHER PUBLICATIONS

Author Unknown, "Linux Programmer's Manual", man7.org, [accessed on Oct. 13, 2021], 12 pages, Retrieved from the Internet: <URL: https://man7.org/linux/man-pages/man7/sched.7.html>.

Chen, et al., "CSSMT: Compiler Based Software Simultaneous Multithreading (SMT)," 2018 26th Euromicro International Conference on Parallel, Distributed and Network-based Processing (PDP), Mar. 21-23, 2018, 8 pages, EEE, Cambridge, UK, DOI: 10.1109/PDP2018.2018.00017, Retrieved from the Internet: <URL: https://ieeexplore.ieee.org/document/8374440>.

Feliu, et al., "Perf&Fair: A Progress-Aware Scheduler to Enhance Performance and Fairness in SMT Multicores," IEEE Transactions on Computers, May 2017 [accessed on Oct. 13, 2021], pp. 905-911, vol. 66, No. 5, IEEE, DOI: 10.1109/TC.2016.2620977, Retrieved from the Internet: <URL: https://ieeexplore.ieee.org/document/7676358>.

Wikichip, "POWER9—Microarchitectures—IBM", WikiChip Chips & Semi, [accessed on Oct. 13, 2021], 3 pages, Retrieved from the Internet: <URL: https://en.wikichip.org/wiki/ibm/microarchitectures/power9>.

Wikipedia, "Simultaneous multithreading", Wikipedia, the free encyclopedia, [accessed on Oct. 13, 2021], 6 pages, Retrieved from the Internet: <URL: https://en.wikipedia.org/wiki/Simultaneous_multithreading>.

\* cited by examiner

300

```
int main (void) {
  _Decimal128 value;
  _Decimal64 rate;
  int   periods;
  int   period;
  scanf ("%DDg %Dg%d\n", &value,
         &rate, &periods);
  for (period = 1; period <= periods; ++period)
    value = value*(1.dd+ rate);
  return 0;
}
```

301

```
.file    "2.c"
.abiversion 2
.section    ".text"
.align 2
.globl main
.type   main, @function
main:
    std 31,-8(1)
    stdu 1,-48(1)
;;; insert system call to tell OS
;;; what CPU unit this application use most
;;; set the system call number
    li 0,606
;;; set the parameter for the cpu unit type
    li 3,6
;;; call the system call
    sc
    mr 31,1
```

| System Call Table 400 |
|---|
| 0 restart_syscall |
| 1 exit |
| 4 write |
| 327 bind |
| 600 res_usage |

| Res_Usage Parameter 410 |
|---|
| 1 ALU |
| 2 DIV |
| 3 ST_D |
| 4 FP |
| 5 CRYPT |
| 6 DFU |

FIG. 4

OPERATING SYSTEM (OS) SCHEDULER AND COMPILER FOR CODE GENERATION OPTIMIZATION IN A (SIMULTANEOUS MULTI-THREADING) SMT ENABLED CPU

BACKGROUND

The present invention relates to computer systems, and more specifically to an improved OS scheduler and compiler for code generation optimization in an SMT enabled CPU.

SMT is a microprocessor technology that allows multiple instruction streams (threads) to execute on the same physical processor. The number of concurrent threads is implemented as a multiple of two and is based on the chip architecture. The SMT threads are implemented as physical hardware threads and are enabled at the OS level as software threads. Each CPU can be configured to respond to particular requests, such as for a crypto resource. However, if the OS dispatches two software threads to the same CPU resource, one will execute, while contention causes the other thread to wait.

It would be advantageous for the OS scheduler to proactively detect the contention and dispatch each thread requesting the same CPU resource to separate CPUs.

SUMMARY

A method is provided. An enhanced compiler identifies instructions for execution among them, instructions directed to an inner computation unit of a CPU core. In response to identifying instructions directed to the inner computation unit, locating in a system call table a system call to indicate a begin of an executable code block of instructions that are directed to the inner computation unit of the CPU core. The enhanced compiler searches the system hardware registry for the parameter corresponding to the inner computation unit of the CPU core. The system call is inserted as an interrupt instruction in the compiler output at the begin of the executable code block of instructions that are directed to the inner computation unit of the CPU core. The enhanced compiler can insert more than one system call in the executable code. This occurs for each set of instructions directed to an inner computation unit that the enhanced compiler encounters. The enhanced compiler executable code output is saved for later selection by a scheduler of an operating system.

Embodiments are further directed to computer systems and computer program products having substantially the same features as the above-described computer-implemented method.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 illustrates a view of SMT enhanced compiler output, according to an embodiment of the present invention;

FIG. 4 illustrates an exemplary system call table showing output system calls and as used by the OS scheduler, according to an embodiment of the present invention;

DETAILED DESCRIPTION

Figure 1:
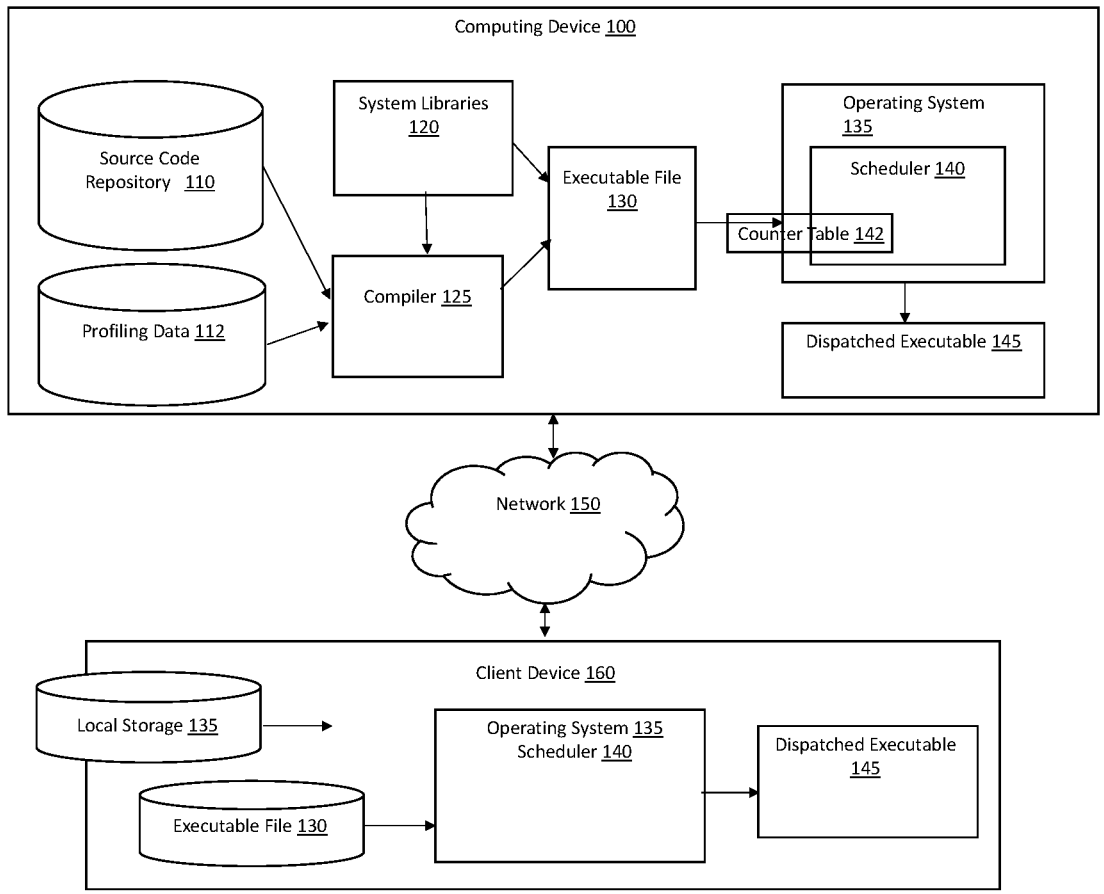
FIG. 1 illustrates the operating environment of a SMT enhanced compiler and enhanced scheduler, according to an embodiment of the present invention.

Beginning now with, FIG. 1 an illustration of the operating environment of an SMT enhanced compiler and enhanced scheduler is presented. The enhanced compiler can be provided as a separate enhancement that can be installed to an existing compiler, such as the GNU Compiler Collection. Alternatively, the compiler enhancement can be provided as a separate compiler product. Similarly, the scheduler enhancement can be provided as a modification to an existing operating system, or as an integrated component of a separate operating system.

A computing device 100 represents any computer capable of executing the methods and instructions of the present invention. The source code repository 110 includes various source code modules and applications that can be input to the enhanced compiler 125. The source code repository 110 can be part of an enterprise-wide source code development and management system or can include source code programs outside of a source code management system.

Profile data 112 is a repository of the execution profile of source code to be compiled. The output of profiling includes an analysis of the instructions the source code will execute, particularly if there is a concentration of instructions that are directed to inner computation units on a core.

The compiler 125 receives as input, source code from the source code repository 110, the profiling data 112, and system libraries 120. The system libraries 120 supply the compiler with system library support for standard functions, macros, and data structures.

The executable file 130 is the output of the compiler 125.

The operating system 135 receives the executable file 130 and notifies the scheduler 140 to add the executable file 130 to the scheduler 140 queue in preparation for dispatching. In making the software thread runnable, the scheduler 140 checks the parameter on the system call specifying which specialized inner computation unit is required. The scheduler 140 can then check if such a unit is available and dispatches the software thread to the free inner computation unit. The scheduler 140 maintains a counter table 142 listing each inner computation unit in the configuration, along with a count corresponding to each. Upon dispatching the thread, the scheduler increments the count corresponding to the inner computation unit. When the thread releases the inner computation unit, and the scheduler decrements the count accordingly.

A client device 160 is a local device, such as a user workstation, where source code from the local client device storage 135 can be compiled on the computing device 100 by way of communicating across a network 150. The executable file 130 can be stored locally on the client device 160 or copied/transferred from the computing device 100.

The operating system 135, scheduler 140, and dispatched executable 145 perform as described with reference to the computing device 100.

Figure 2A:
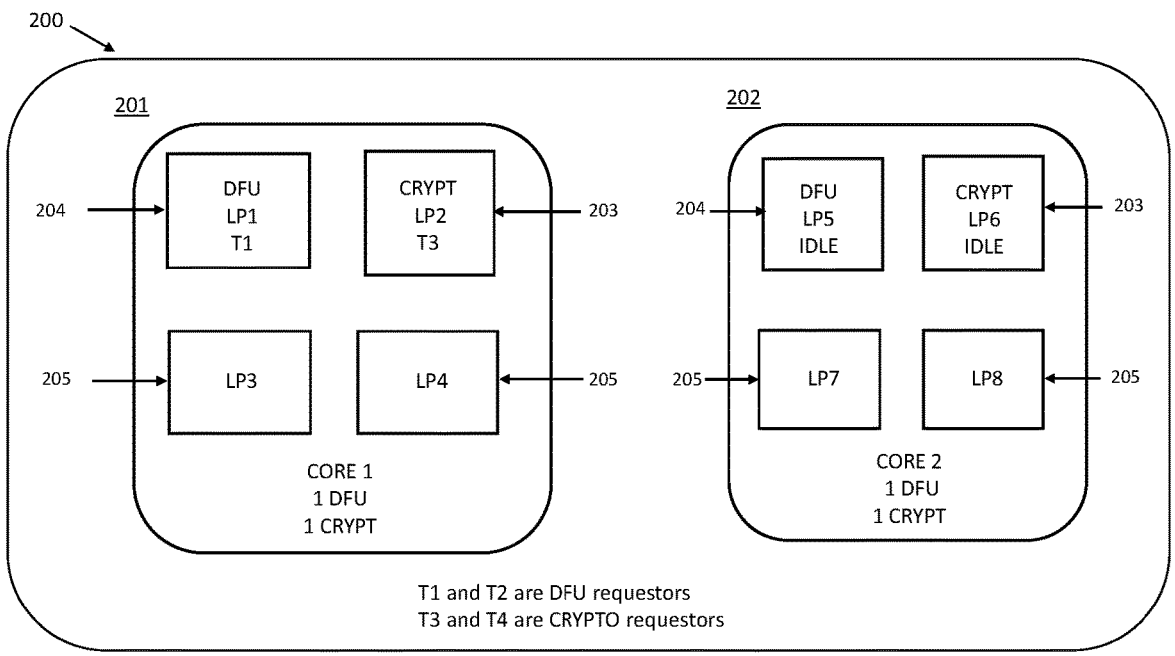
FIG. 2A illustrates a view of an SMT enabled CPU having two cores, in accordance with one or more aspects of the present invention.
Figure 2B:
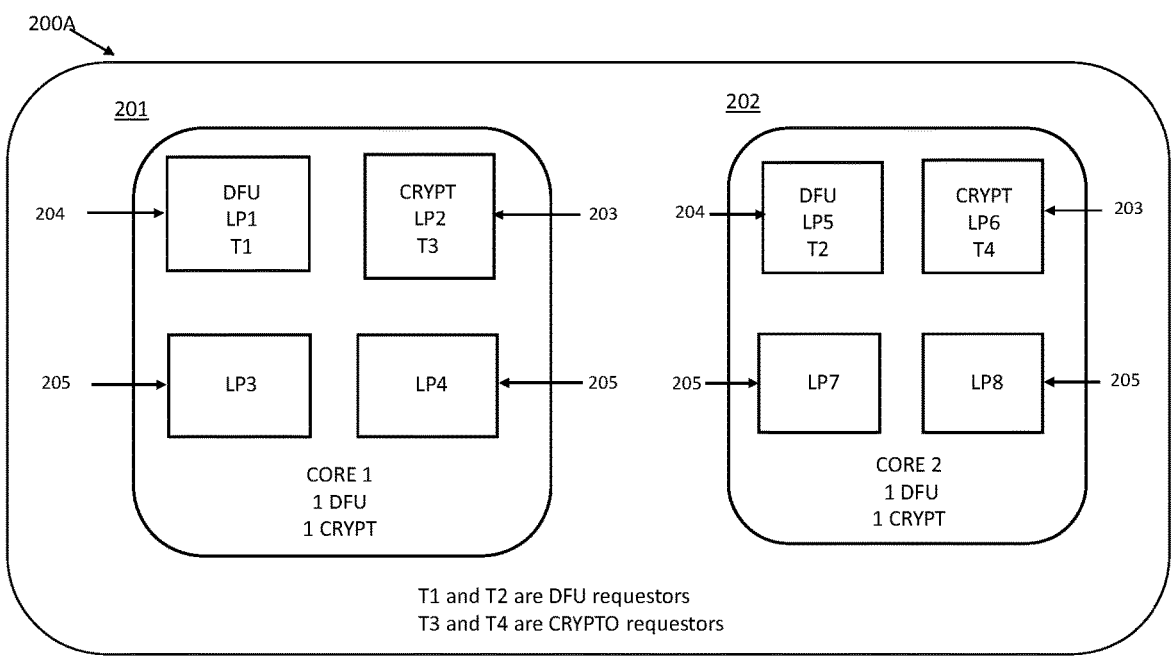
FIG. 2B illustrates another view of an SMT enabled CPU having two cores, in accordance with one or more aspects of the present invention.

Turning now to FIGS. 2A and 2B, an example of dispatching software threads both without (200) and with (200A) embodiments of the present invention is shown.

SMT is a technique for improving the overall efficiency of superscalar CPUs by implementing hardware multithreading on the cores of the CPU. As a result, SMT permits multiple concurrent and independent hardware threads of execution per CPU core that better utilize the resources of processor architectures.

The number of concurrent hardware threads varies by hardware design, depending on the SMT implementation of the particular architecture. The hardware threads are implemented in multiples of two, for example, two, four, or eight hardware threads per core. FIGS. 2A and 2B illustrates an SMT enabled CPU having two cores (201 and 202). Four hardware threads 205 are implemented in each core. Software threads, which are the units of work from the OS and user executable programs, recognize each of the hardware threads as a logical CPU (also referred to as a logical processor, or LP), here LP1-LP8. Each software thread is dispatched to an LP, which then maps the LP to the physical core.

Each core can have one or more specialized inner computation units configured to respond to specific type of requests. In FIGS. 2A and 2B, each core is configured with one DFU 204 for calculating the sum of two decimal floating point numbers, and one CRYPT 203 for cryptographic instructions. Here, software thread T1 is dispatched to DFU 204. The scheduler can potentially dispatch the second software thread T2 to DFU 204 on core 202. It is possible to cause the scheduler to dispatch a thread to the idle DFU on the core 202 (FIG. 2A). However, due to limitations in the compiler and scheduler technologies currently in common use, the default behavior will cause T2 to wait and DFU on core 202 to remain idle. A similar scenario exists regarding the CRYPT 203 resource, where an idle CRYPT 203 resource is available on core 202 (FIG. 2B). Various OSs provide a manual process to bind a thread to a CPU, but this tends to be error prone, and time consuming, especially in large computing environments. Additionally, to do so requires specific knowledge of the inner computation units and thread usage. Embodiments of the present invention enable an enhanced compiler to analyze (profile) the source code statements to determine which CPU units (e.g., DFU) are the most heavily used by that source code.

The compiler then inserts a system call into the executable specifying which inner computation unit of the core is heavily used, and where the utilization occurs in the source code. Another system call is inserted at the end of the code block to indicate the thread is releasing the resource, thereby making the inner computation unit available for another thread. An enhanced scheduler is now aware that the executable is a heavy user of the particular inner computation unit. The scheduler can use that information, in addition to the user-specified scheduler policy, when determining whether the software thread is runnable. For example, the scheduler can look for another core where the required inner computation unit is free and dispatch the software thread to that core, rather than hold the thread in a wait state while an inner computation unit is free on another core.

FIG. 3 illustrates a view of SMT enhanced compiler source code input 300 and the resulting assembly instructions output 301.

Focusing on assembly instructions output 301, as the comment in 310 explain, the compiler identifies that the source code requires the DFU 204 to execute because of the "_Decimal128 value" and "_Decimal64 rate" definitions. This notifies the compiler to generate the specialized system call to direct these instructions to the DFU 204. The compiler searches the OS system call table (400 of FIG. 4) and locates the specialized system call, res_usage, having an identifier of "600." Customizing the OS system call table 400 can be performed using known editing and kernel building processes. This value is loaded into a system register. A res_usage parameter table (410 of FIG. 4) lists the inner computation units configured for each core. Based on the instructions requiring the DFU 204, the compiler locates the associated entry "6," which the compiler also loads into another system register. The res_usage parameter table 410 can be supplied with the compiler product and installed as part of the compiler installation process. Alternatively, both the res_usage parameter table 410 and support for generating the res_usage system call can be added as an extension to an existing compiler product that is already installed. Finally, the "sc" instruction is invoked to execute the res_usage system call. It should be noted that the actual instruction to invoke a system call may be platform specific, depending on the architecture.

Figure 5:
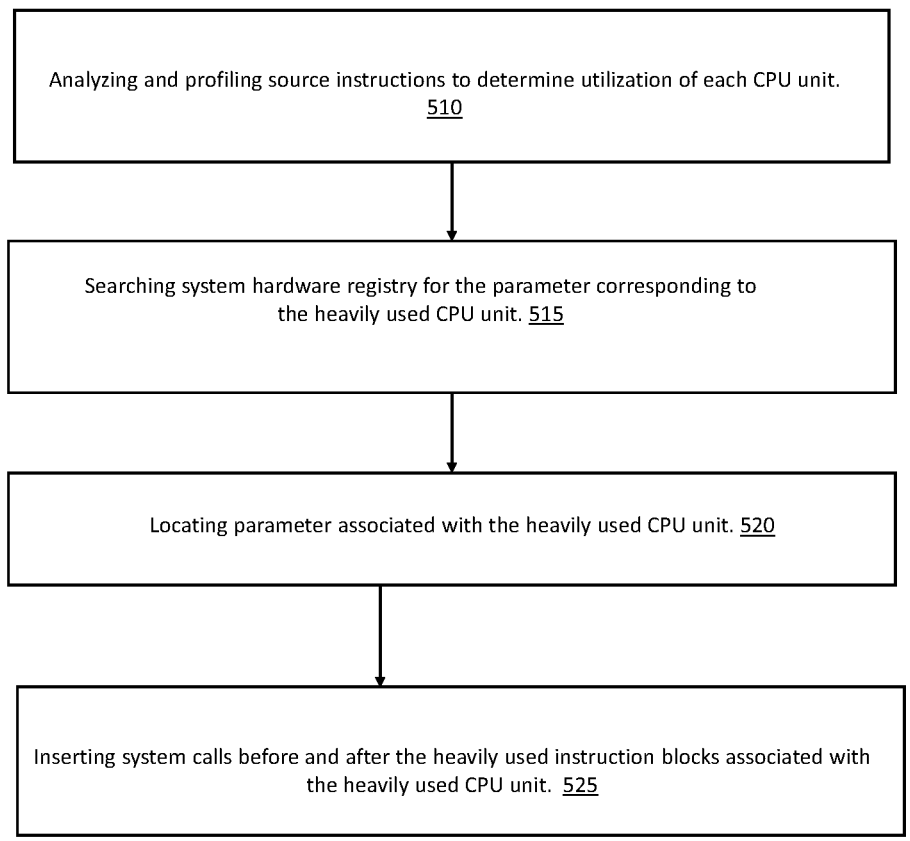
FIG. 5 illustrates a flow chart of the compiler operation, according to an embodiment of the present invention.

FIG. 5 illustrates a flow chart of the compiler operation.

Beginning at 510, the compiler profiles the source code instructions to determine which inner computation units are being used.

At 515, the compiler, being aware of which inner computation units are being used, searches the system hardware registry for the identifier associated with each inner computation unit. The compiler begins constructing a res_usage specialized system call.

At 520, the compiler locates the identifier associated with the inner computation unit in a res_usage parameter table, and inserts this value as the parameter of the res_usage system call.

At 525, the compiler inserts the res_usage system call into the compiled output at the start of the block of code referencing the inner computation unit. A corresponding system call, res_release, identifies the end of the block of code.

Figure 6:
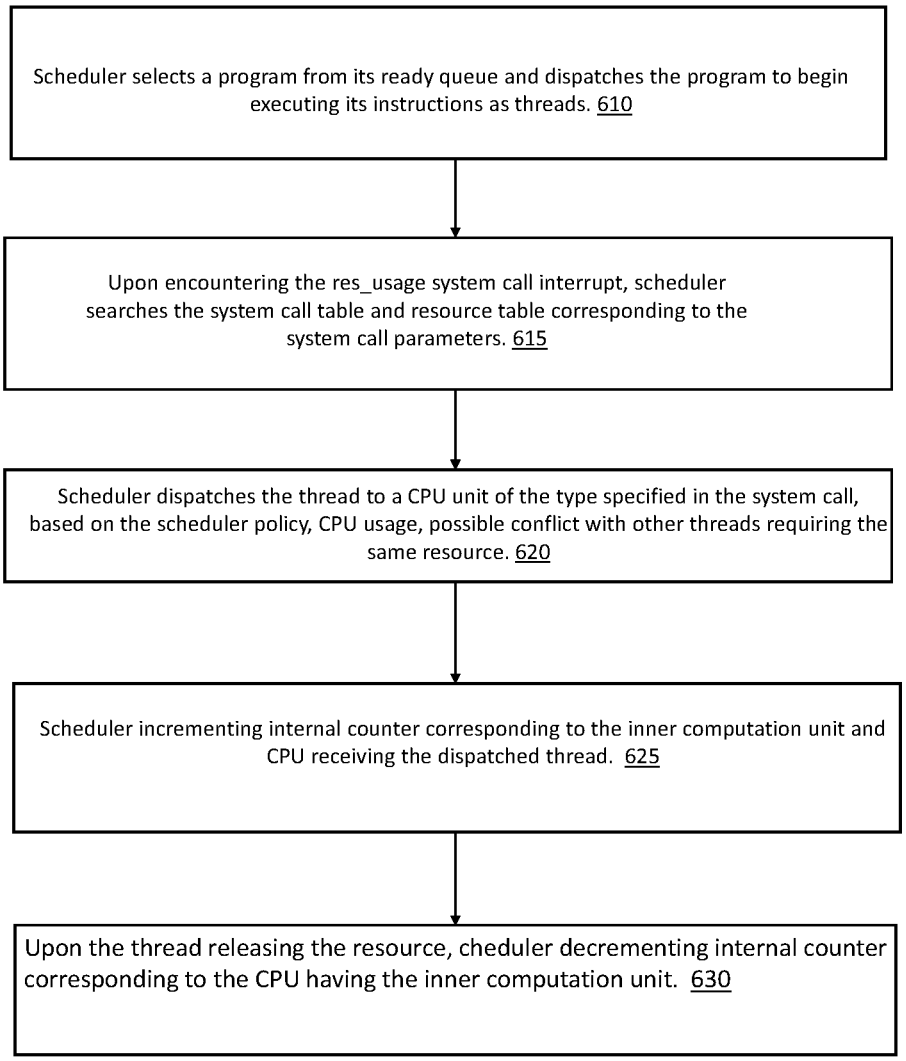
FIG. 6 illustrates a flow chart of the OS scheduler operation, according to an embodiment of the present invention.

FIG. 6 illustrates a flow chart of the OS scheduler operation.

At 610, the scheduler selects a program to run from its ready queue and dispatches it to begin executing.

At 615, the scheduler/dispatcher reaches the code block 310 that includes the system call interrupt. The scheduler responds to the res_usage system call by selecting the type of inner computation unit specified in the system call. The scheduler can choose an available inner computation unit having the lowest count of its type of unit, indicating it has been less busy than other inner computation units of its type, then dispatch the thread there, and increment the corresponding entry in the counter table 142.

At 620, the scheduler dispatches the thread to a CPU having an available inner computation unit of the type specified in the res_usage system call. However, if such a unit is not available, the scheduler can the default scheduler policy, even if it means having the thread wait.

At 625, the scheduler increments the internal counter corresponding to the inner computation unit and CPU receiving the dispatched thread.

At 630, upon the thread releasing the inner computation unit, the scheduler decrements the corresponding internal counter.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram, or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be constructed to maintain the proper protection for the invention first described.

What is claimed is:

1. A method, comprising:
   profiling, by an enhanced compiler, source code input to identify which of a plurality of inner computation units of a CPU core are used;
   in response to identifying the used inner computation units of the CPU core, locating in a system hardware registry an identifier corresponding to the inner computation unit of the CPU core;
   inserting an entry to a system call table as an interrupt instruction in the compiler output at a begin and an end of the executable code block of instructions that are directed to the inner computation unit of the CPU core; and
   saving the enhanced compiler executable code output for later selection by a scheduler of an operating system.

2. The method of claim 1, wherein the enhanced compiler is provided as an enhancement to an existing non-enhanced compiler.

3. The method of claim 1, further comprising:
   an enhanced scheduler selecting a runnable thread of the enhanced compiler executable code output to execute;
   in response to finding the system call to indicate the begin of the executable code block of instructions, choosing an available inner computation unit corresponding to a parameter in the system call;
   based on dispatching the thread associated with the executable code block to the core of the CPU having the available inner computation unit incrementing an internal counter corresponding to the inner computation unit and CPU receiving the dispatched thread; and
   upon completion of the dispatched thread, the enhanced scheduler decrementing the internal counter corresponding to the inner computation unit and CPU receiving the dispatched thread.

4. The method of claim 1, wherein the enhanced scheduler selects the enhanced compiler executable code output for execution based on a least busy inner computation unit of its type.

5. The method of claim 1, wherein the enhanced scheduler selects a default scheduling algorithm based on no available inner computation unit corresponding to the parameter in the system call.

6. The method of claim 1, wherein the enhanced compiler executable code output is based on granularity of inner computation unit requirements of individual threads, and wherein the enhanced scheduler dispatches based on granularity of the thread.

7. A computer program product, the computer program product comprising a non-transitory tangible storage device having program code embodied therewith, the program code executable by a processor of a computer to perform a method, the method comprising:
   profiling, by an enhanced compiler, source code input to identify which of a plurality of inner computation units of a CPU core are used;
   in response to identifying the used inner computation units of the CPU core, locating in a system hardware registry an identifier corresponding to the inner computation unit of the CPU core;
   inserting an entry to a system call table as an interrupt instruction in the compiler output at a begin and an end of the executable code block of instructions that are directed to the inner computation unit of the CPU core; and
   saving the enhanced compiler executable code output for later selection by a scheduler of an operating system.

8. The computer program product of claim 7, wherein the enhanced compiler is provided as an enhancement to an existing non-enhanced compiler.

9. The computer program product of claim 7, further comprising:
   an enhanced scheduler selecting a runnable thread of the enhanced compiler executable code output to execute;
   in response to finding the system call to indicate the begin of the executable code block of instructions, choosing an available inner computation unit corresponding to a parameter in the system call;
   based on dispatching the thread associated with the executable code block to the core of the CPU having the available inner computation unit incrementing an internal counter corresponding to the inner computation unit and CPU receiving the dispatched thread; and
   upon completion of the dispatched thread, the enhanced scheduler decrementing the internal counter corresponding to the inner computation unit and CPU receiving the dispatched thread.

10. The computer program product of claim 7, wherein the enhanced scheduler is provided as an enhancement to an existing non-enhanced scheduler.

11. The computer program product of claim 7, wherein the enhanced scheduler selects the enhanced compiler executable code output for execution based on a least busy inner computation unit of its type.

12. The computer program product of claim 7, wherein the enhanced scheduler selects a default scheduling algorithm based on no available inner computation unit corresponding to the parameter in the system call.

13. The computer program product of claim 7, wherein the enhanced compiler executable code output is based on granularity of inner computation unit requirements of individual threads, and wherein the enhanced scheduler dispatches based on granularity of the thread.

14. A computer system, comprising:
   one or more processors;
   a memory coupled to at least one of the processors;
   a set of computer program instructions stored in the memory and executed by at least one of the processors in order to perform actions of:
   profiling, by an enhanced compiler, source code input to identify which of a plurality of inner computation units of a CPU core are used;
   in response to identifying the used inner computation units of the CPU core, locating in a system hardware registry an identifier corresponding to the inner computation unit of the CPU core;
   inserting an entry to a system call table as an interrupt instruction in the compiler output at a begin and an end of the executable code block of instructions that are directed to the inner computation unit of the CPU core; and
   saving the enhanced compiler executable code output for later selection by a scheduler of an operating system.

15. The computer system of claim 14, wherein the enhanced compiler is provided as an enhancement to an existing non-enhanced compiler.

16. The computer system of claim 14, further comprising:
- an enhanced scheduler selecting a runnable thread of the enhanced compiler executable code output to execute;
- in response to finding the system call to indicate the begin of the executable code block of instructions, choosing an available inner computation unit corresponding to a parameter in the system call;

based on dispatching the thread associated with the executable code block to the core of the CPU having the available inner computation unit incrementing an internal counter corresponding to the inner computation unit and CPU receiving the dispatched thread; and upon completion of the dispatched thread, the enhanced scheduler decrementing the internal counter corresponding to the inner computation unit and CPU receiving the dispatched thread.

17. The computer system of claim 14, wherein the enhanced scheduler selects the enhanced compiler executable code output for execution based on a least busy inner computation unit of its type.

18. The computer system of claim 14, wherein the enhanced scheduler selects a default scheduling algorithm based on no available inner computation unit corresponding to the parameter in the system call.

\* \* \* \* \*